W. H. Guild,
Draining Sugar.
No. 87,487. Patented Mar. 2, 1869.

Witnesses,
Fred. Haynes
J. W. Coombs

Inventor,
Wm. H. Guild

WILLIAM H. GUILD, OF BROOKLYN, E. D., NEW YORK.

Letters Patent No. 87,487, dated March 2, 1869.

IMPROVED PROCESS OF PURGING AND DRAINING SUGAR.

The Schedule referred to in these Letters Patent and making part of the same.

*To all whom it may concern:*

Be it known that I, WILLIAM H. GUILD, of the Eastern District of the city of Brooklyn, in the county of Kings, and State of New York, have invented a new and useful Improvement in the Process of Purging and Draining Sugar; and I do hereby declare that the following is a full, clear, and exact description of the same, reference being had to the accompanying drawings, forming part of this specification.

This invention consists in subjecting sugar, while being purged or drained by pressure acting upon its upper surface, in consequence of a vacuum produced underneath it, to the action of steam, or the vapor of water, which being admitted to its upper surface, percolates among and between its granules, and moistens them, thereby facilitating, expediting, and more thoroughly effecting the purging and purification, without the drenching and dissolution of the sugar consequent upon purging with water.

In carrying out the invention, different kinds of apparatus may be used, as, for instance, the sugar may be placed in a chamber or apartment with a perforated false bottom, or horizontal partition, upon which the sugar is placed, and below which a vacuum, or partial vacuum is produced, by an air-pump or other means, while the steam or vapor, with or without air, is admitted above; or the sugar may be purged in moulds, the necks of which are connected with an air-pump, or exhausting-apparatus, while the moulds themselves are contained in a chamber, or apartment, to which the steam or vapor is admitted, in such manner as to have free access to the tops or mouths of the moulds.

The first-mentioned of the above methods is that which I have chosen for the illustration of my invention, and is represented in the accompanying drawings, in which—

Figure 1:
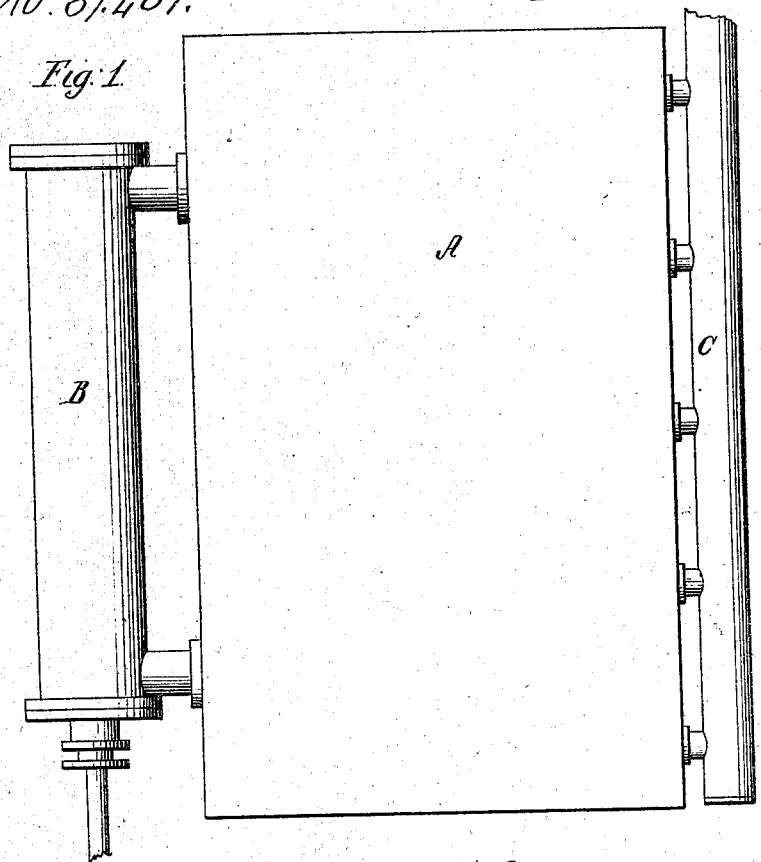

Figure 1 is a plan view, and

Figure 2:
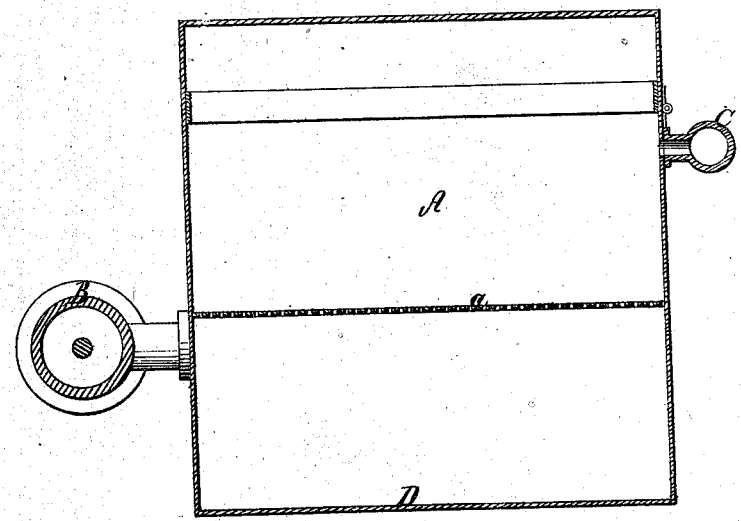

Figure 2, a vertical sectional view of the same.

Similar letters of reference indicate corresponding parts in both the figures.

A is a chamber having the false bottom, or horizontal partition $a$, made perforated, reticulated, or foraminous, having the air-pump B connected with it, below the said bottom, or partition, and having the steam-pipe C connected with it at one or more, but preferably at numerous points above the said bottom, or partition.

The upper part of the chamber A is not required to be air-tight, but only closed to such an extent as to prevent the diffusion and escape of the steam.

In the operation of this apparatus, the sugar having been spread over the false bottom, $a$, the air-pump is set in operation, and steam at a low pressure, or if of a high pressure, in very small quantities, is admitted through the pipe C.

The exhaust from a steam-engine will serve very well for the purpose.

The steam spreading itself over the surface of the sugar, while a partial vacuum is produced below it, will percolate among and between the granules, moistening them to a suitable, yet not excessive degree, and so assisting and expediting the purging and cleansing-process.

In order that the sirup or liquor which drains through and from the sugar, may be prevented from passing through the air-pump, and clogging or choking it, the air-pump is connected with the chamber A, at some distance above the bottom proper, D, that the sirup or liquor may fall into the lower part of the chamber A, from which it may be drawn off, from time to time, by any suitable means.

When the sugar is sufficiently purged, the steam is shut off, while the air-pump is kept in operation, and the admission of air, either cold or heated, is continued to the upper part of the chamber A, such air percolating through the sugar, for the purpose of drying it.

What I claim as my invention, and desire to secure by Letters Patent, is—

Subjecting sugar, while being purged or drained, to the action of steam or vapor, substantially as and for the purpose herein described.

WM. H. GUILD.

Witnesses:
FRED. HAYNES,
HENRY PALMER.